May 29, 1923.  
G. C. KITCHEN ET AL  
EGG TURNING MEANS FOR INCUBATORS  
Filed Nov. 6, 1922
1,456,559
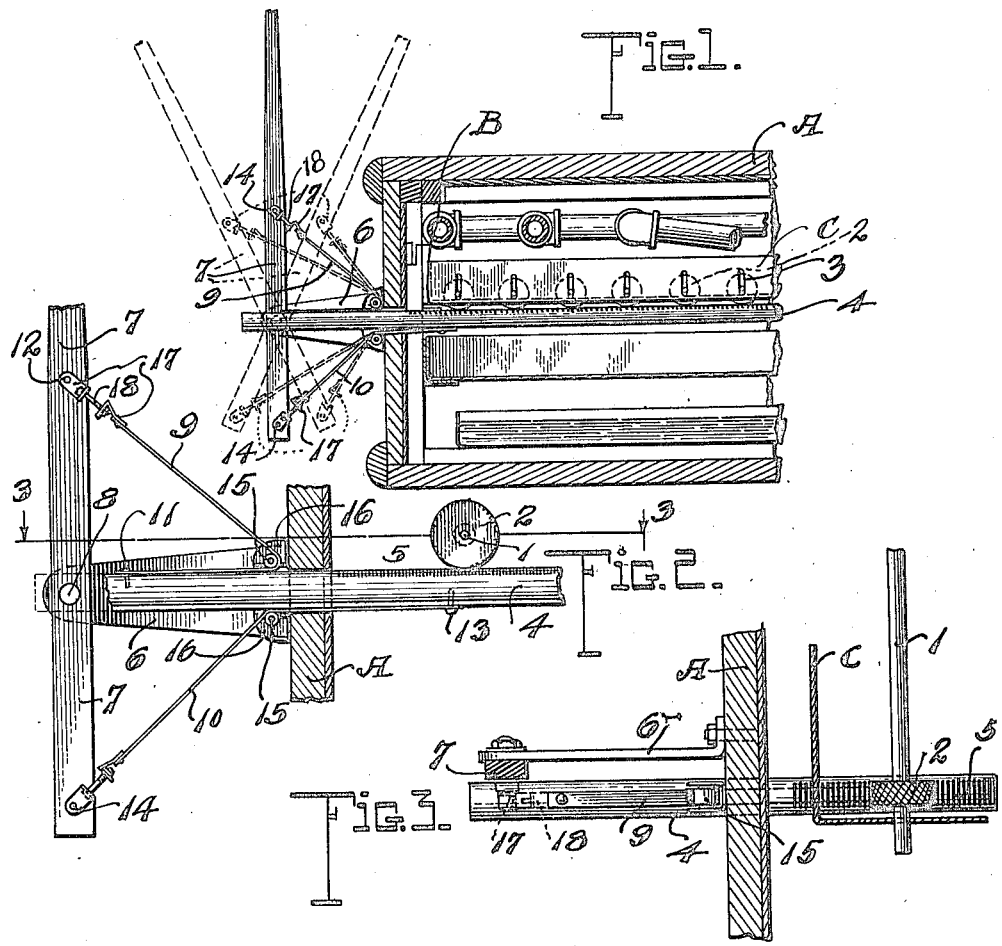
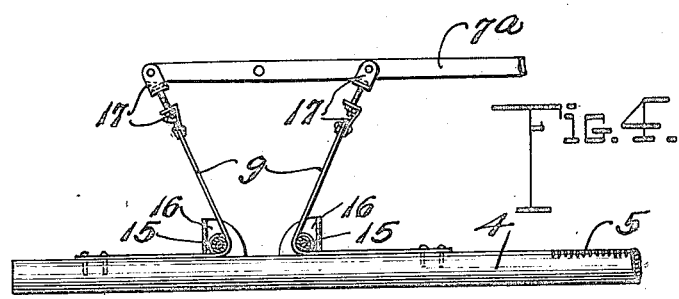
Inventor  
G. C. Kitchen  
C. Kitchen Patented May 29, 1923.

UNITED STATES PATENT OFFICE.

1,456,559

GROVER C. KITCHEN AND CLAIRE KITCHEN, OF SONOMA, CALIFORNIA.

EGG-TURNING MEANS FOR INCUBATORS.

Application filed November 6, 1922. Serial No. 599,369.

*To all whom it may concern:*

Be it known that we, GROVER C. KITCHEN and CLAIRE KITCHEN, citizens of the United States, residing at Sonoma, in the county of Sonoma and State of California, have invented certain new and useful Improvements in Egg-Turning Means for Incubators, of which the following is a specification.

The present invention has to do with improvements in incubators and in particular to egg turning means therefor.

The primary object of these improvements is to provide a simple arrangement for rotating the roller supports of an egg tray whereby the eggs resting upon the same may be turned over from time to time during the incubation period by the adjustment of manually operative means adapted to act upon all of the egg supports at one time, these instrumentalities being so disposed as not to interfere with, or rather not to reduce the maximum capacity of the incubator.

With the above and other objects in view, the invention consists in certain combinations and arrangements of the parts as will more fully appear as the description proceeds, the novel features thereof being pointed out in the appended claims.

In the drawing:

Figure 1 is a fragmentary vertical sectional view of an incubator showing in elevation the egg turning means constituting the subject matter of the present invention.

Figure 2 is an enlarged detail view, partly in section, of the egg turning means alone.

Figure 3 is a sectional view taken about on the plane indicated by line 3—3 of Figure 2.

Figure 4 is a detail fragmentary view of a slightly modified form of the invention.

Corresponding and like parts are referred to in the following description, and indicated in all of the views of the drawing, by like reference characters.

Referring to the drawing:

A designates an incubator casing of conventional form, such as shown in our previous patent for improvements in incubators No. 1,368,562, dated February 15, 1921, said casing being provided at its sides with tray supports B on which is disposed the egg tray C.

The egg tray is provided with a plurality of rotatable egg supports or rollers 1 journaled in the sides of the tray, each of these supports carrying at one end a friction roller 2, preferably composed of rubber the face of which is suitably knurled, corrugated or otherwise roughened, to insure sufficient frictional engagement, as hereinafter explained. The end of the supports 1 carrying the rollers 2 are received in slots 3 in the side of the tray providing a yieldable mounting for the ends of the egg supports.

Reciprocally mounted in the casing A so as to lie directly beneath the rollers 2 of the egg supports, is a bar member 4 which may be of metal tubing or of wood, but preferably having its upper surface corrugated or grooved as indicated at 5 to provide a frictional operating face for coaction with the rollers 2 of the egg supports. The bar 4 sustains the yielding end of the egg supports 1 so that with the weight of the eggs thereon, a sufficient frictional engagement between the rollers and the bar is provided to insure a rotation of these egg supports when the bar 4 is reciprocated by the manually operative means now to be set forth. The rollers are mounted in the slots for a vertical yielding movement so that they rest by gravity upon the frictional face of the bar and are thereby driven. This frictional driving of the bar permits a slip or yielding movement in case the eggs are in such position as to offer resistance and prevents injury thereto which would be liable in a positively operated connection between the supporting roller and the actuating bar.

The bar 4 extends outwardly of the incubator casing A at one side thereof and a bracket 6 projects from the casing adjacent thereto, said bracket having pivotally mounted thereon an adjusting lever 7, the pivot 8 for which is positioned in spaced relation to the lower extremity of the lever. The bar 4 is connected to this lever by the flexible connections 9 and 10, the former being attached at one end to the outer end of the bar 4 as at 11 and at its opposite end to the lever 7 at one side of its pivot as indicated at 12, while the latter connection 10 is connected at one end of the bar at a point 13 within the casing and to the lever 7 at its lower end, as shown at 14. These connecting elements are composed preferably of flat steel straps and they pass about the pulleys 15 mounted upon the side of the casing A in suitable brackets 16. The connections are maintained taut by means of a coupling consisting of the angle pieces 17 and an adjusting bolt 18 by means of which the slack in the connection may be taken up or the connections with the lever readily removed whenever it is desired to displace the bar 4 from the casing.

It will be observed that in Figures 1 to 3 the lever 7 is vertically positioned and movement forwardly or rearwardly as shown in dotted lines in Figure 1 will cause the bar 4 to be reciprocated inwardly or outwardly for the purpose of imparting rotation to the egg supports 1 with a view to turning over the eggs carried thereby.

In Figure 4 we have slightly modified the arrangement by positioning the lever 7ª in a horizontal position which may be desirable in some instances, this necessitating merely a slight rearrangement of the flexible connections with the reciprocating bar as clearly shown in the figure and, therefore, not requiring additional explanation.

From the foregoing it will be obvious that the egg turning means of this invention may be applied to the ordinary incubator without interfering with the arrangement of the egg tray or trays and the other instrumentalities contained therein so that the maximum capacity of the incubator may be maintained without difficulty. The arrangement enables the dismantling or attachment of the device as desirable for shipping or storage purposes and the maintenance of proper adjustment of the connections between the operating lever and the reciprocating bar forming features of the egg turning apparatus.

Having thus described our invention, what we claim as new and desire to secure by Letters Patent, is:

1. In egg turning means for incubators, the combination with rotatable egg supports on which the eggs rest, of a bar member having frictional engagement with said supports, and manually operative means for reciprocating said bar member including a lever pivotally supported at one side of the incubator and connecting means between the bar and the lever connected with the latter at opposite sides of its pivot, whereby the bar may be shifted in opposite directions by corresponding movements of the lever.

2. In egg turning means for incubators, the combination with an egg tray and rotatable egg supports yieldably mounted in said tray, of a bar member reciprocally mounted beneath one end of the egg supports and actuating the supports, and a lever pivotally mounted on the incubator and connected with the bar member for imparting reciprocal movement thereto from time to time to adjust the supports.

3. In egg turning means for incubators, the combination with an egg tray, supporting means therefor, a plurality of egg supports journaled in the sides of the tray, said supports having yielding connection with the tray at one end, friction rollers carried by the yieldable ends of the egg supports, a reciprocating bar mounted beneath the egg tray and sustaining the yieldable end of the egg supports, a lever adjacent to said bar, and flexible connections intermediate the lever and the bar whereby the bar may be shifted to and fro to impart rotation to the egg supports.

4. In egg turning means for incubators, the combination with rotatable egg supports on which the eggs rest, a reciprocating bar frictionally coacting with said egg supports, a lever pivotally mounted adjacent to one end of said bar, and adjustable flexible connections between the bar and the lever connecting with the same at opposite sides of the lever pivot.

5. In egg turning means for incubators, the combination with rotatable egg supports on which the eggs rest, a reciprocating bar frictionally coacting with said egg supports, a lever pivotally mounted adjacent to one end of said bar, adjustable flexible connections between the bar and the lever connecting with the same at opposite sides of the lever pivot, said flexible connections including an adjustable coupling member, and pulleys about which the flexible connections pass.

6. In egg turning means for incubators, the combination with an egg tray, supporting means therefor, a plurality of egg supports journaled at the sides of the tray, said supports having yielding connection with the tray at one end, friction rollers carried by the yieldable ends of the egg supports, a reciprocating bar beneath the egg tray and sustaining the yieldable ends of the egg supports, and means for reciprocating said bar to oscillate said egg supports.

In testimony whereof we affix our signatures.

GROVER C. KITCHEN.
CLAIRE KITCHEN.